United States Patent [19]

Arakawa

[11] 4,347,598
[45] Aug. 31, 1982

[54] TONE ARM ASSEMBLY
[75] Inventor: Fumio Arakawa, Tokorozawa, Japan
[73] Assignee: Pioneer Electronic Corporation, Tokyo, Japan
[21] Appl. No.: 209,359
[22] Filed: Nov. 24, 1980
[30] Foreign Application Priority Data
  Nov. 30, 1979 [JP] Japan ................. 54-154193
[51] Int. Cl.³ .............................................. G11B 3/16
[52] U.S. Cl. ...................................... 369/254; 369/75; 369/258
[58] Field of Search .................. 369/75, 244, 247, 251, 369/254, 258, 264

[56] References Cited
U.S. PATENT DOCUMENTS

| 2,351,948 | 6/1944 | Gay | 369/251 |
|---|---|---|---|
| 3,167,317 | 1/1965 | Wilson | 369/254 |
| 4,101,133 | 7/1978 | Aoki et al. | 369/254 |
| 4,113,265 | 9/1978 | Iyeta | 369/254 |

FOREIGN PATENT DOCUMENTS 418373 10/1934 United Kingdom ................ 369/244

Primary Examiner—John W. Shepperd
Attorney, Agent, or Firm—Sughrue, Mion, Zinn, Macpeak & Seas

[57] ABSTRACT

A tone arm assembly in which an upper plate is given added strength by providing it with apertures only in the region of the drive motor and the tone arm support shaft without the need of a long aperture to accommodate the entire tone arm assembly. The tone arm shaft is rotatably supported through a first rotatable member onto a second rotatable member and finally to a vertical support shaft. A connecting member and weight shaft are detachably coupled to the first rotatable member through damper means. Prior to attachment of the connecting member and weight shaft, the tone arm shaft can be rotated in a vertical plane through an angle of approximately 100°.

11 Claims, 9 Drawing Figures

TONE ARM ASSEMBLY

BACKGROUND OF THE INVENTION

The present invention relates to a tone arm assembly for record players.

A typical tone arm assembly of the prior art will be described with reference to FIGS. 1 and 2. In this tone arm assembly, a base plate 3 is supported by support posts 1 through spring members 2. A tone arm support base 6 and drive motor 5 for driving a turntable 4 are secured to the base plate 3 and are covered with an upper panel 7 supported on the upper portions of the support posts 1. The turntable 4 is turned on a spindle 5a of the motor 5. In order to facilitate the manufacture of this assembly, necessary parts are installed on the base plate 3 before the upper panel 7 is set in place surrounding the remaining parts.

Although the horizontal rotational movement of the prior art tone arm 8 is relatively free, the vertical rotational movement thereof is restricted to only a small range of up-and-down movement. Because of this restriction, for installation of the upper panel 7 during the final steps of assembly, it is necessary to form therein a relatively long and large hole 7a through which the tone arm 8 extends. The hole 7a joins with a hole 7c for the spindle 5a of the motor 5 and with a hole 7b for the tone arm support base 6. With such a construction, the upper panel is weak in mechanical strength. In order to compensate for the insufficient mechanical strength thereof, a second reinforcement panel is required resulting in a high cost.

SUMMARY OF THE INVENTION

In view of the above noted defects, an object of the present invention is to provide a tone arm assembly in which a tubular arm shaft of a tone arm can be raised to a sufficient extent by separation of a weight shaft therefrom and in which the interchange of the weight shafts can be readily achieved.

This, as well as other objects of the invention, are met by a tone arm assembly including a first rotatable member joined to one end of a tone arm shaft at the other end of which is located a phonocartridge. The first rotatable member is rotatably connected to a second rotatable member. A connecting member to which is coupled a weight shaft is detachably mounted on the first rotatable member. Prior to the attachment of the connecting member and weight shaft to the first rotatable member, the tone arm shaft can be rotated through an angle of approximately 100°, as defined by stop means provided on the first rotatable member, so that an upper plate can easily be installed. The connecting member may be joined to the first rotatable member through damper means and the weight shaft can also be joined to the connecting member through a second damper means. With this construction, the upper plate need only have apertures corresponding to the turntable or motor shaft and the vertical shaft to which the second rotatable member is coupled and no large long aperture is required to accommodate the entire length of the tone arm assembly thereby giving the upper plate increased strength when compared to the structure of the prior art.

DESCRIPTION OF THE PREFERRED EMBODIMENTS

Figure 3:
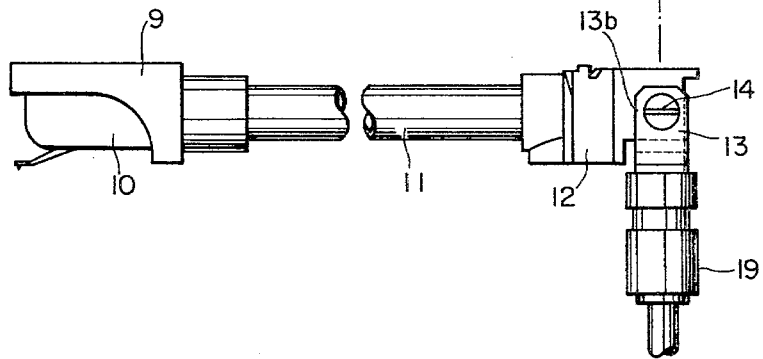
FIG. 3 is an exploded view showing a preferred embodiment of a tone arm assembly according to the present invention.

The invention will hereinafter be described with reference to FIGS. 3, 4A-4C, and 5A and 5B of the accompanying drawings. FIG. 3 is an exploded view showing a tone arm 11 provided at an end with a pick-up phonocartridge 10 including a head cover 9. The tone arm 11 is coupled at the other end to a first rotatable member 12. The first rotatable member 12 is rotatably mounted on a second rotatable member 13 with pivot screws 14 engaged with side walls of the second member 13. A connecting member 17 to which is coupled a weight shaft 16 is mounted on the first rotatable member 12 by a pair of screws 15 which are screwed in downwardly with the longitudinal axis of the arm shaft 11 being aligned with that of the weight shaft 16 by the connecting member 17.

Figure 4A:
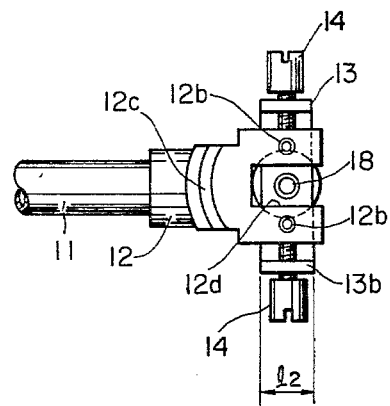
FIGS. 4A, 4B and 4C are, respectively, a plan view, a rear view and a side view of first and second rotatable members used in the tone arm assembly of FIG. 3.
Figure 4B:
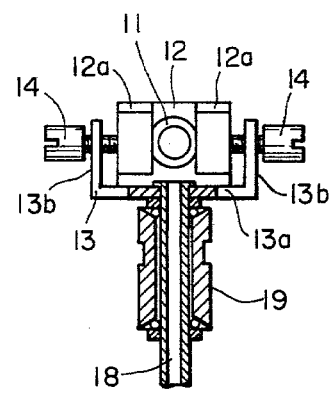
Figure 4C:
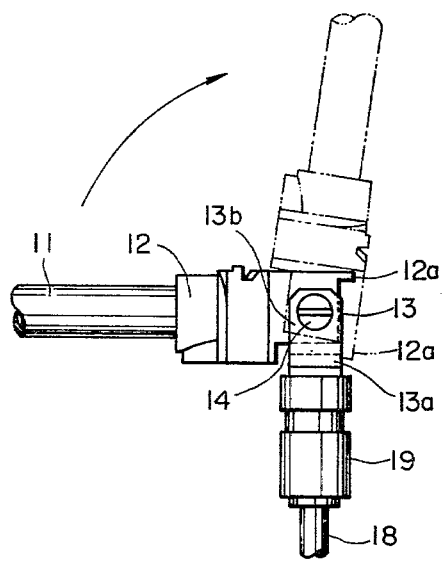

FIGS. 4A to C show details of the first and second rotatable members 12 and 13. A pair of stops 12a are formed at the upper rear edge of the first rotatable member 12 on opposite sides of the arm shaft 11. As shown in FIG. 4C, upon vertical rotation of the tone arm, the stops 12a are brought into abutment with a bottom portion 13a of the second rotatable member 13 to thereby limit the vertical rotational angle of the tone arm to approximately 100°. Reference character 12b designtes a pair of threaded holes for receiving the screws 15 and 12c designates a groove with which the peripheral wall of the connecting member 17 engages.

A tubular vertical shaft 18 is fixedly secured to the bottom portion 13a of the second rotatable member 13. Signal lines (not shown) connected to the pick-up cartridge 10 through the interior of the arm shaft 11 are arranged in an interior of the vertical shaft 18 through a U-shaped portion 12d of the first rotatable member 12. The vertical shaft 18 is received by a bearing 19 installed on the tone arm support base 6 as shown in FIG. 4C.

Figure 5A:
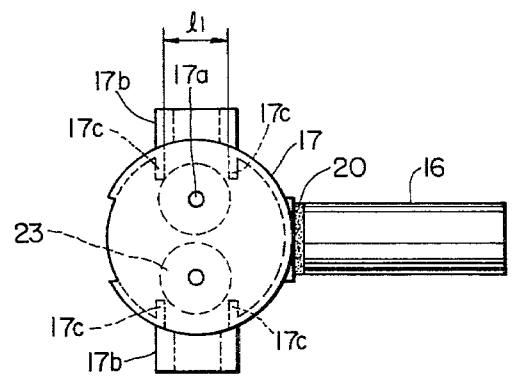
FIG. 5A is a plan view of a connecting member and the weight shaft of the tone arm assembly of FIG. 3
Figure 5B:
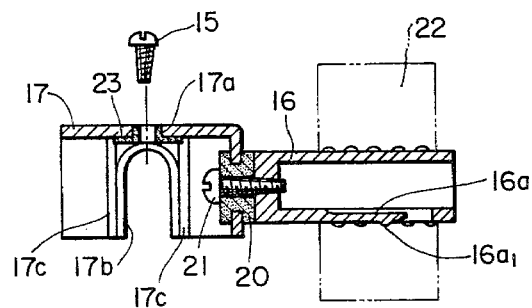
' and FIG. 5B is a cross-sectional view thereof.

FIGS. 5A and 5B show the relationship between the weight shaft 16 and the connecting member 17. The weight shaft 16 is connected to the connecting member 17 through a damper rubber member 20 by a screw 21. A lower portion of the weight shaft 16 is cut to form a strip-shaped portion 16a which is provided with a projection 16a₁. A weight 22 is pressingly engaged with the weight shaft 16 at the projection 16a₁ and is movable fore and aft by rotation of the weight 22. Rubber packings 23 are provided on the rear side of the connecting member 17 at a pair of mounting holes 17a to thereby impart a damper effect to the mounting portion of the first rotatable member 12. With this construction, resonance of the tone arm is effectively damped or prevented.

On both sides of the connecting member 17 are formed apertures 17b from which the screws 14 of the second rotatable member 13 project. Upright walls 17c are formed inside the apertures 17b which define the rotational range of the second rotatable member 13 when the connecting member 17 is mounted on the first rotatable member 12 by the screws 15. That is, with respect to the connecting member 17, the distance $l_1$ between the confronting upright walls 17c is set somewhat greater than the width $l_2$ of the side walls 13b of the second rotatable member 13 so that the connecting member 17 once mounted on the first rotatable member 12 is vertically rotatable upon the second rotatable member 13 to a limit corresponding to the dimensional difference therebetween. With this construction, when fully assembled, the tone arm is movable up and down by a limited amount as desired.

As described above, according to the present invention, the same desired operation as in the prior art construction is obtained when the tone arm is fully assembled. That is, a large angle of rotation of the arm shaft 11 is permitted in the horizontal direction and a much smaller angle of rotation thereof is permitted in the vertical direction. Also, if the screws 15 are removed so as to separate the connecting member 17 and weight shaft 16 from the first rotatable member 12, the arm shaft 11 can be rotatably raised to an angle of approximately 100° and retained in this condition.

Figure 1:
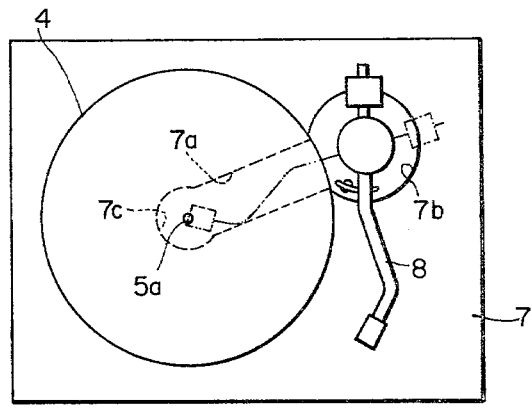
FIG. 1 is a plan view of a record player according to the prior art.
Figure 2:
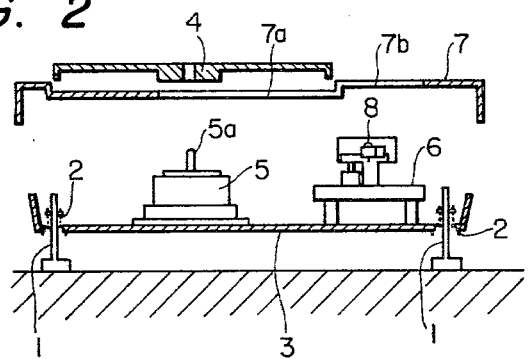
FIG. 2 is an illustration relating to the assembly of the prior art record player.
Figure 6:
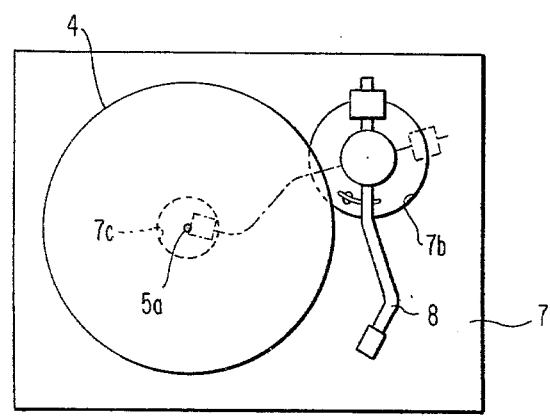
FIG. 6 is a plan view of a record player showing an upper panel which is not required to have a long longitudinal slot thereon.

Thus, in the assembly of the record player according to the present invention, the arm shaft 11 can be raised to a vertical position. Therefore, only the hole 7b for the tone arm support base 6 and the hole 7c for the turntable spindle 5a need be provided in the upper panel 7 as shown in FIG. 6. That is, the long longitudinal slot 7a (shown in FIGS. 1 and 2) for the insertion of the tone arm can be dispensed with. In the prior art construction, the hole 7a must extend under the turntable. Therefore, according to the present invention, the problem of lack of mechanical strength of the upper panel 7 is eliminated. Also, when the tone arm is fully raised, it is possible to readily exchange the cartridge in the case where the head cover cannot be removed. According to another aspect of the present invention, since the connecting member and the weight shaft are separable from the arm shaft, the materials used therefor and the stiffness of the vibration damper materials therefor can be varied widely so that the natural resonance frequency of the tone arm can be varied. Reproduction frequency characteristics can be readily changed. At the same time, any desirable design or color can be freely used to thereby change the appearance of the tone arm assembly.

What is claimed is:

1. A tone arm assembly comprising:
    a tone arm shaft having a cartridge assembly mounted on a first end thereof;
    a first rotatable member coupled to the other end of said tone arm shaft;
    a second rotatable member extending in the vertical direction, said second rotatable member being rotatable about a vertical axis and being mounted upon a base member;
    said first rotatable member being rotatably supported by said second rotatable member and said first rotatable member being rotatable about a horizontal axis;
    connecting means detachably mounted on said first rotatable member for limiting said rotational movement of said first rotatable member about said horizontal axis; and
    a weight shaft coupled integrally with said connecting member.

2. The tone arm assembly of claim 1 wherein said first rotatable member is rotatably supported by said second rotatable member so that said first rotatable member can be rotated about said vertical axis through an angle of more than approximately 90° when said connecting means is detached from said first rotatable member.

3. The tone arm assembly of claim 1 further comprising a first vibration damper member disposed between said connecting member and said weight shaft.

4. The tone arm assembly of claim 3 further comprising a second vibration damper member for detachably mounting said connecting member to said first rotatable member.

5. The tone arm assembly of any of claims 1-4 further comprising an upper panel, said upper panel having a first hole for accommodating a spindle and a second hole for accommodating a tone arm support base and being solid throughout most of the region of said tone arm assembly.

6. A tone arm assembly comprising:
    a base plate, a drive motor and a turntable coupled to be rotated by said drive motor, said drive motor being secured to said base plate;
    a tone arm support base secured to said base plate;
    a vertical tubular shaft extending upwardly from said tone arm support base;
    a tone arm shaft having a phonocartridge mounted at a first end thereof;
    a first rotatable member coupled to the other end of said tone arm shaft;
    a second rotatable member coupled to the upper end of said vertical shaft, said second rotatable member being rotatable about a vertical axis upon said vertical shaft and said first rotatable member being rotatable about a horizontal axis on said second rotatable member, said first rotatable member being provided with stop means wherein said tone arm shaft is rotatable from a horizontal position prior to the attachment thereto of a connecting member and a weight shaft;
    said connecting member having apertures on opposite sides thereof and being detachably mounted to said first rotatable member; and
    an upper plate disposed over said motor and tone arm support base, said upper plate having separate apertures therein corresponding to the positions of a turntable drive spindle and said vertical shaft and being solid throughout most of the extent of said tone arm shaft and cartridge.

7. The tone arm assembly of claim 6 wherein said tone arm shaft is rotatable from the horizontal position through an angle of approximately greater than 90° about said horizontal axis when said connecting member is detached from said first rotatable member.

8. The tone arm assembly of claim 6 further comprising screws which extend through said apertures formed on opposite sides of the connecting member for attaching said first rotatable member to said second rotatable member.

9. The tone arm assembly of claim 8 wherein said connecting member has upright walls formed on the inside of said apertures positioned so as to set the rotational range of said second rotatable member within predetermined limits.

10. The tone arm assembly of claim 6 further comprising a first rubber damper and at least one screw for dampingly connecting said connecting member to said weight shaft.

11. The tone arm assembly of claim 10 further comprising a second rubber damper and at least one screw for dampingly connecting said connecting member to said first rotatable member.

* * * * *